United States Patent
Wu et al.

(10) Patent No.: US 9,967,517 B2
(45) Date of Patent: May 8, 2018

(54) METHODS OF TRANSMITTING AND RECEIVING AUDIO-VIDEO DATA AND TRANSMISSION SYSTEM THEREOF

(71) Applicant: Silergy Semiconductor Technology (Hangzhou) LTD, Hangzhou, ZheJiang Province (CN)

(72) Inventors: Qichang Wu, Hangzhou (CN); Weifeng Shi, Hangzhou (CN)

(73) Assignee: Silergy Semiconductor Technology (Hangzhou) LTD, Hangzhou (CN)

( * ) Notice: Subject to any disclaimer, the term of this patent is extended or adjusted under 35 U.S.C. 154(b) by 0 days. days.

(21) Appl. No.: 15/375,310

(22) Filed: Dec. 12, 2016

(65) Prior Publication Data

US 2017/0195622 A1    Jul. 6, 2017

(30) Foreign Application Priority Data

Dec. 30, 2015    (CN) .......................... 2015 1 1018356

(51) Int. Cl.
| | |
|---|---|
| *H04N 7/04* | (2006.01) |
| *G09G 5/00* | (2006.01) |
| *H04N 5/38* | (2006.01) |
| *H04N 21/233* | (2011.01) |

(52) U.S. Cl.
CPC .............. *H04N 7/04* (2013.01); *G09G 5/00* (2013.01); *H04N 5/38* (2013.01); *H04N 21/233* (2013.01)

(58) Field of Classification Search
CPC ............................... H04N 7/04; H04L 1/0084

USPC ......................................................... 348/495
See application file for complete search history.

(56) References Cited

U.S. PATENT DOCUMENTS

| | | | |
|---|---|---|---|
| 5,132,992 A | 7/1992 | Yurt et al. | |
| 5,579,239 A | 11/1996 | Freeman et al. | |
| 6,665,002 B2 | 12/2003 | Liu | |
| 2005/0185649 A1* | 8/2005 | Ichimura | ........... H04L 12/40071 370/392 |
| 2007/0035611 A1 | 2/2007 | Wu | |
| 2011/0044212 A1* | 2/2011 | Tani | ..................... H04M 7/0042 370/260 |
| 2011/0103404 A1* | 5/2011 | Bafra | .................... H04L 1/0084 370/476 |

* cited by examiner

*Primary Examiner* — Michael Lee
(74) *Attorney, Agent, or Firm* — Michael C. Stephens, Jr.

(57) ABSTRACT

A method for transmitting an audio-video data can include: receiving a video signal from a video source and an audio signal from an audio source; receiving an audio data of the audio signal, and detecting an audio frame clock signal of the audio signal; converting the audio data to an audio data sequence with a first encoding rule; generating a start data code, an end data code, and an audio frame clock code according to the audio data sequence and the audio frame clock signal with a second encoding rule, where the first encoding rule is different than the second encoding rule; generating a low speed data frame according to the audio frame clock signal and the audio data sequence; inserting the start data code at the beginning of each audio data sequence, and inserting the end data code at the ending of each audio data sequence.

18 Claims, 9 Drawing Sheets

METHODS OF TRANSMITTING AND RECEIVING AUDIO-VIDEO DATA AND TRANSMISSION SYSTEM THEREOF

RELATED APPLICATIONS

This application claims the benefit of Chinese Patent Application No. 201511018356.9, filed on Dec. 30, 2015, which is incorporated herein by reference in its entirety.

FIELD OF THE INVENTION

The present invention generally relates to the field of audio-video data communication, and in particular to methods of transmitting and receiving an audio-video data and transmission systems for transferring the audio-video data over a serial data line.

BACKGROUND

Video and audio data of electronic products, such as car multimedia navigation systems, megapixel camera systems, and car rear seat entertainment facilities, can bring excellent experiences to customers. The requirements on the transmission of video and audio data have been higher with the rapid development of electronic information technology, and realization of fast transmission of audio-video data with fewer resources is a prominent direction of audio-video data transmission.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

In one approach, two separate single serial lines, such as a video coaxial line and an audio coaxial line may be necessary for transmission of the video signal and audio signal. During the transmission, the video signal and the audio signal may not be transmitted simultaneously. As a result, the video signal and the audio signal may not be simultaneously received. Also, the product cost of the system may be increased when two separate signal serial lines are used.

Figure 1A:
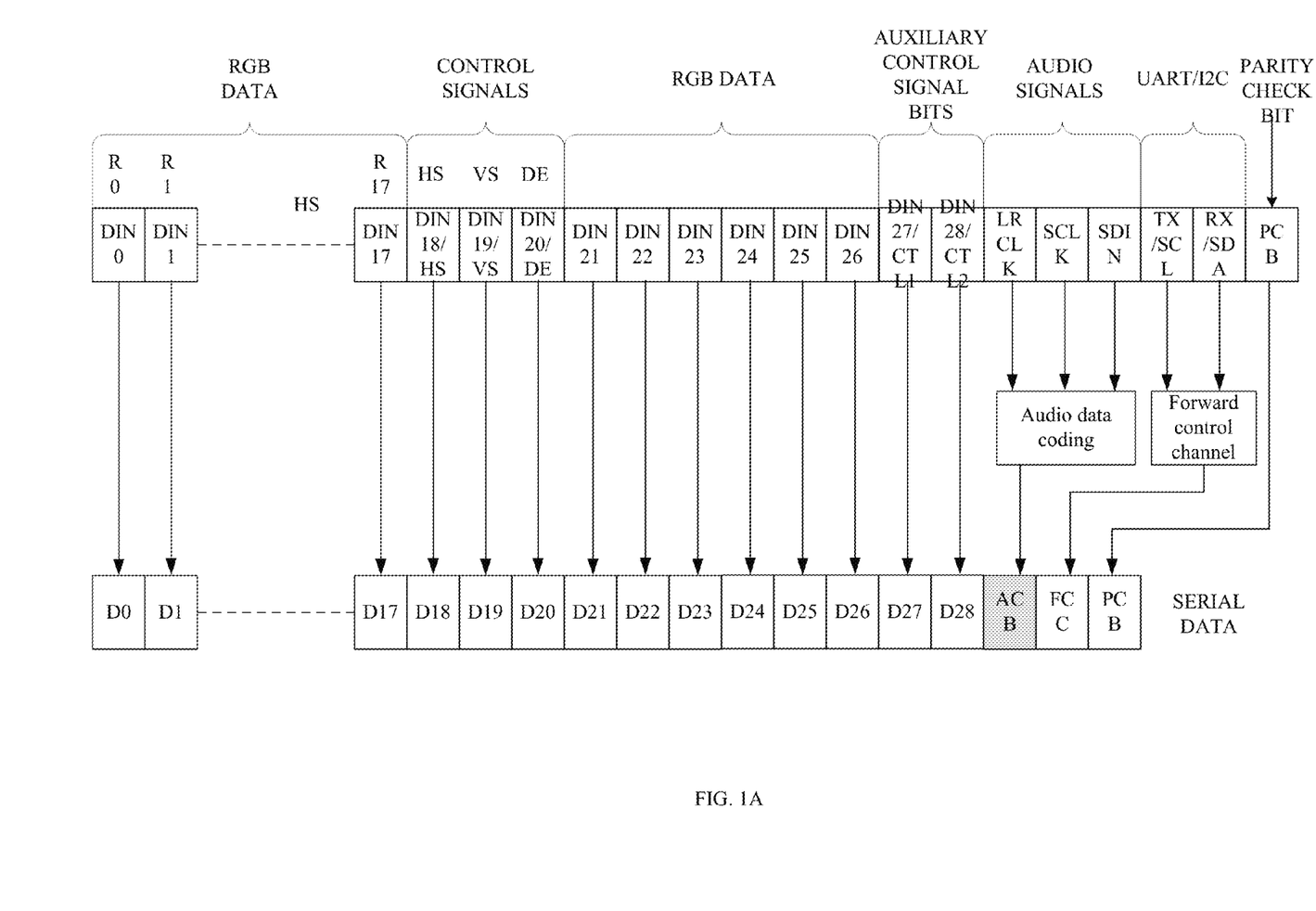
FIG. 1A is a diagram of an example format of serial data when the video signal and audio signal are simultaneously transmitted over a signal serial line.

Referring now to FIG. 1A, shown is a diagram of an example format of serial data when the video signal and audio signal are simultaneously transmitted over a signal serial line. In this example, the video signal and the audio signal are encoded and serialized in accordance with certain rules in order to enable simultaneous transmission of video and audio signals over a signal serial line, so as to form a serial data having the format as shown. The serial data of 32-bit is described as an example herein, where D0-D26 are the video signal bits, D27-D28 are the auxiliary control signal bits, and D29 is the audio signal bit obtained by encoding the audio data and a clock signal, D30 is the feedforward control channel bit, and D31 is the parity check bit. The serial data in FIG. 1A can be transmitted to the receiving side through a signal serial line between the transmitting side and the receiving side. Then, the received serial data may be de-serialized and decoded at the receiving side in order to respectively obtain the video signal and the audio signal.

Figure 1B:
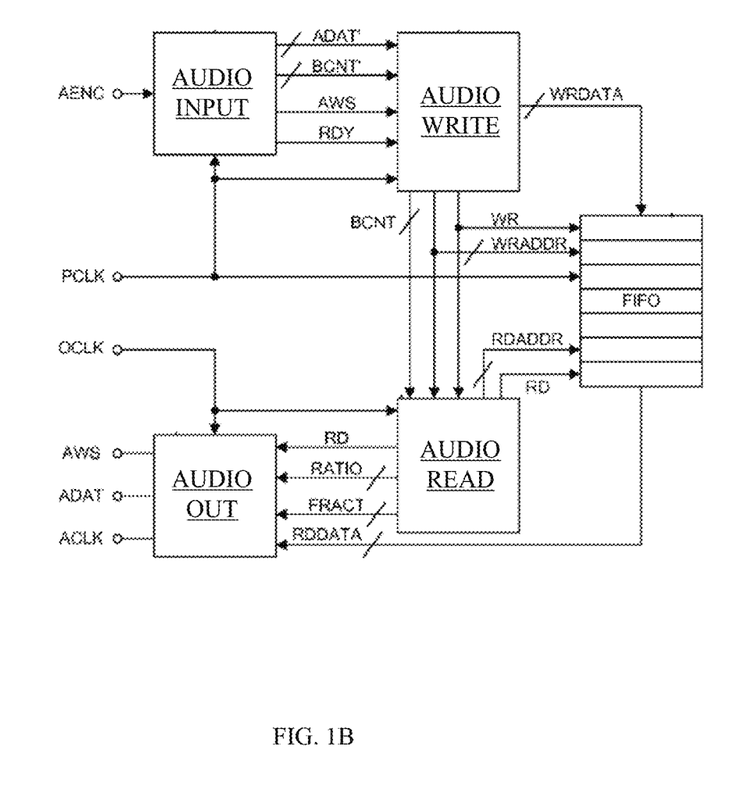
FIG. 1B is a schematic block diagram of an example audio decoder that recovers audio signal when the video signal and audio signal are simultaneously transmitted over a signal serial line.

Referring now to FIG. 1B, shown is a schematic block diagram of an example audio decoder that recovers an audio signal when the video signal and audio signal are simultaneously transmitted over a signal serial line. The clock signal is PCLK when the audio data is input and is OCLK (e.g., an oscillation signal) when the audio data is output. Thus, the accuracy of reading the audio signal may be affected due to inconsistent clock signals during the write and read processes, which may result in a certain error of the audio signal during the transmission process. In addition, with the above-described implementation, the transmission efficiency may be relatively low since the audio signal is only transmitted in the audio signal time interval during the transmission of the serial data.

In one embodiment, a method for transmitting an audio-video data can include: (i) receiving a video signal from a video source and an audio signal from an audio source; (ii) receiving an audio data of the audio signal, and detecting an audio frame clock signal of the audio signal; (iii) converting the audio data to an audio data sequence with a first encoding rule; (iv) generating a start data code, an end data code, and an audio frame clock code according to the audio data sequence and the audio frame clock signal with a second encoding rule, where the first encoding rule is different than the second encoding rule; (v) generating a low speed data frame according to the audio frame clock signal and the audio data sequence; (vi) inserting the start data code at the beginning of each audio data sequence, and inserting the end data code at the ending of each audio data sequence; (vii) inserting the audio frame clock code to the low speed data frame at the beginning of each audio frame clock signal; (viii) packing the low speed data frame and the video signal to form a high speed data frame; and (ix) serializing the high speed data frame to form an audio-video transmission data.

Figure 2:
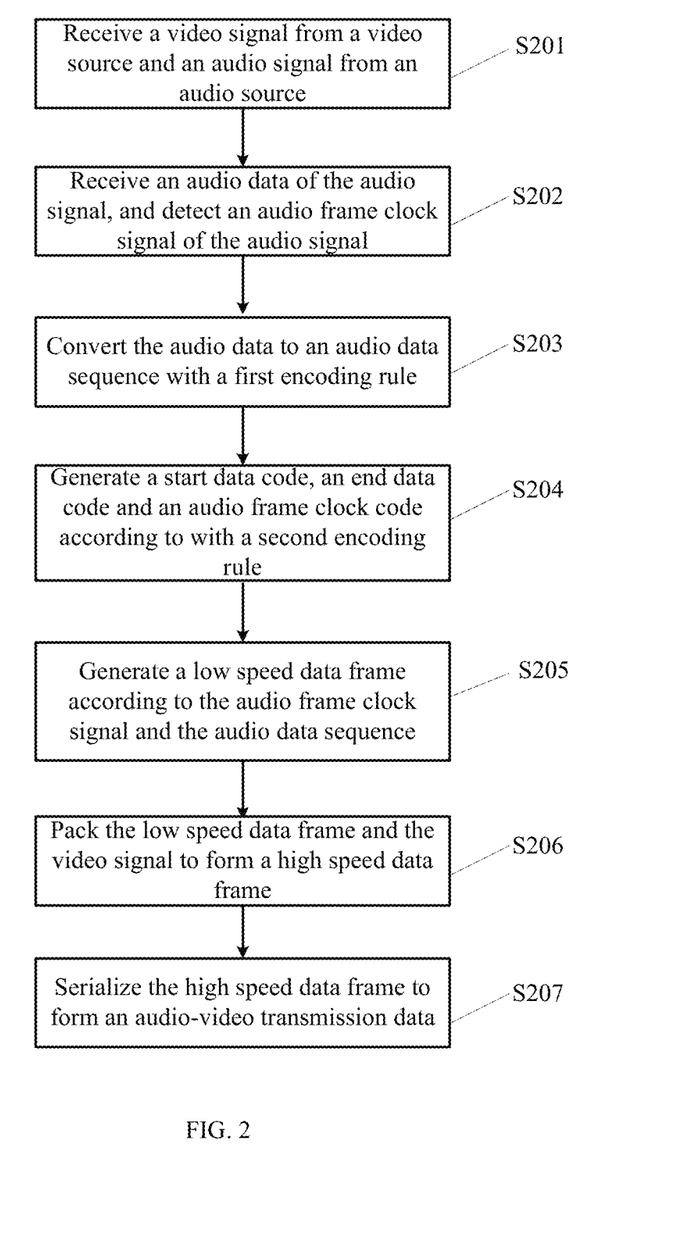
FIG. 2 is a flow diagram of an example method of transmitting an audio-video data, in accordance with embodiments of the present invention.

Referring now to FIG. 2, shown is a flow diagram of an example method of transmitting an audio-video data, in accordance with embodiments of the present invention. In this particular example, a video signal received from a video source and an audio signal received from an audio source may be simultaneously received and processed without any determined order. The order shown in the example of FIG. 2 is only for convenience of description, but other orderings can also be supported in certain embodiments. In this example, the transmitting of an audio-video data may include, at S201, receiving a video signal from an video source and an audio signal from an audio source. At S202, an audio data of the audio signal can be received, and an audio frame clock signal of the audio signal can be detected. At S203, the audio data can be converted to an audio data sequence according to a first encoding rule.

At S204, a start data code, an end code, and an audio frame clock code can be generated according to the audio data sequence and the audio frame clock signal in the light of a second encoding rule. At S205, a low speed data frame can be generated according to the audio frame clock signal and the audio data sequence. The start data code can be inserted at the beginning of each audio data sequence, and the end data code may be inserted at the ending of each audio data sequence. The audio frame clock code can be inserted to the low speed data frame at the beginning of each audio frame clock signal. At S206, the low speed data frame and the video signal may be packed to form a high speed data frame. At S207, the high speed data frame can be converted to form an audio-video transmission data.

The first encoding rule as described herein is different from the second encoding rule. The data code, end data code, and audio frame clock code are identified by some characteristic codes that do not appear in the encoded audio data sequence, and those characteristic codes can be used to separate the encoded audio data sequence and inserted audio frame clock signal. For example, the start data code can be inserted at the beginning of each audio data sequence, and the end data code can be inserted at the ending of each audio data sequence, to distinguish each audio data sequence. In addition the audio frame clock code may be inserted to the low speed data frame at the beginning of each audio frame clock signal.

In a particular example, a rising edge of the audio frame clock signal can be detected, and the audio frame clock code may be inserted to the low speed data frame at the rising edge of each audio frame clock signal. In some examples, between every two frames of the low speed data frame can be padded with an invalid data. During the formation of the low speed data frame, the audio data sequence, the audio frame clock code, and the invalid data may be configured to form the low speed data frame at a certain (e.g., predetermined) timing.

Figure 3:
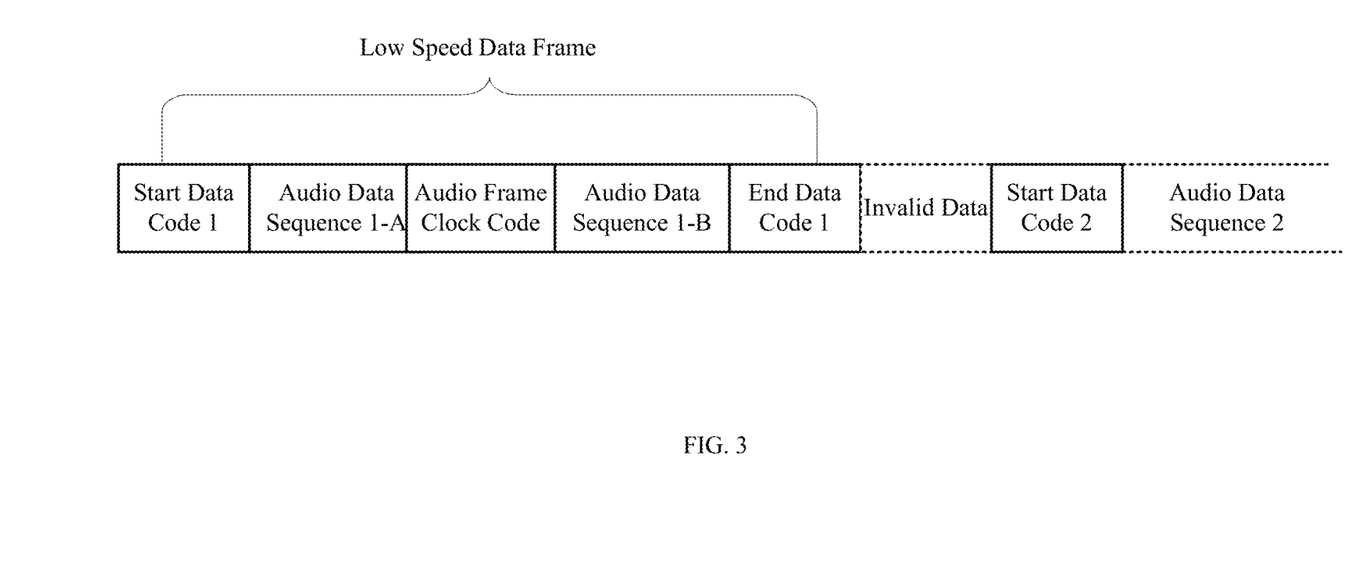
FIG. 3 is a diagram of an example format of a low speed data frame, in accordance with embodiments of the present invention.

Referring now to FIG. 3, shown is a diagram of an example format of a low speed data frame, in accordance with embodiments of the present invention. The start data code may be inserted at the beginning of each low speed data frame, and then the data for recording the audio data sequence can start to be outputted. Since the audio frame clock data has the highest priority, the data output of the current audio data sequence may be interrupted once the audio frame clock signal is detected during the outputting of the audio data sequence. After the audio frame clock signal is inserted, the remaining data of the current audio data sequence may continue outputting until the end, and the end data code may be inserted at the end time. Similarly, when the starting time of another low speed data frame is detected, the above operation can be repeated to sequentially record the audio data sequence and the audio frame clock signal. The start data code and the end data code that have a different encoding method from the audio data sequence may be used to distinguish each audio data sequence. Between every two frames of the low speed data frame can be padded with an invalid data.

The first encoding rule can be any appropriate encoding rule, and the second encoding rule may be an encoding rule that is different from the first encoding rule. This is so as to distinguish the start data code, the end data code, and the audio frame clock signal code from the audio data sequence. With this special encoding method, particularly the special encoding method of the audio frame clock signal, the clock signal used in the writing and reading of the audio data can be made uniform, such that the audio frame clock signal can be accurately transmitted and restored. This can ensure the accuracy of reading the audio data, and avoid substantially errors in the transmission of the audio signal.

Figure 4:
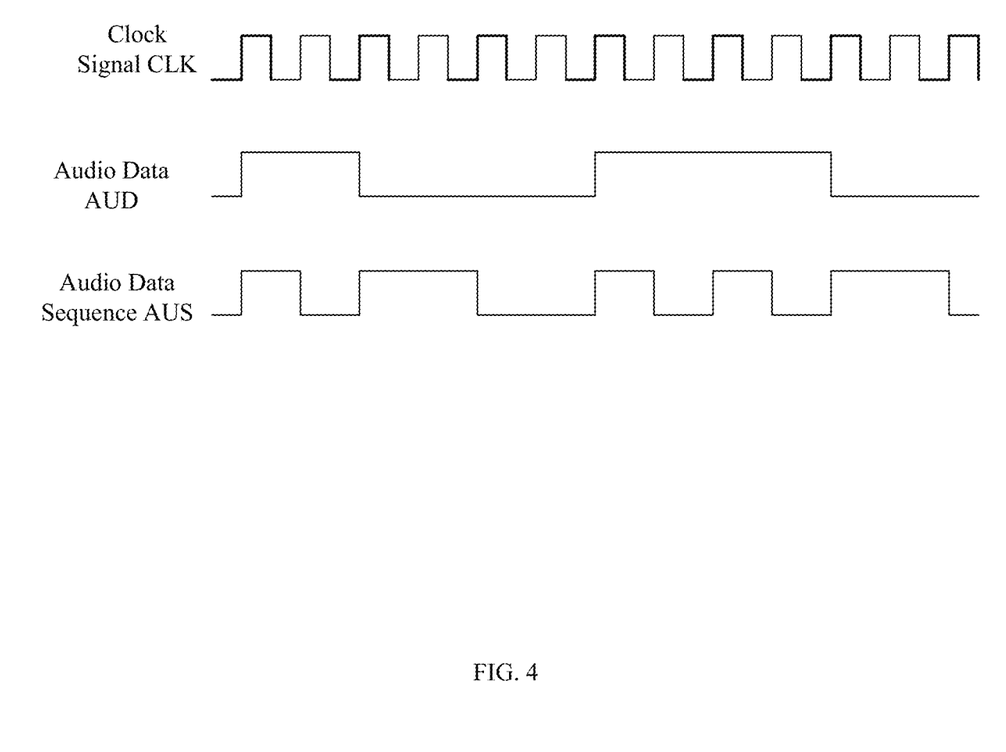
FIG. 4 is a waveform diagram of an example biclock-mark channel encoding rule.

Referring now to FIG. 4, shown is a waveform diagram of an example biclock-mark channel encoding rule. Unlike the two-phase mark encoding rule, according to the biclock-mark channel encoding rule of this example, a data bit can be represented by using two states of two adjacent high frequency clock periods. In this way, two high frequency clocks are used to transmit one low speed data bit. The state of a first clock period can be opposite to the previous state, and the state of a second clock period may be the same or opposite to the state of the first clock period, which depends on the value of audio data AUD.

When the audio data AUD is 1, the audio data sequence AUS may change its potential for one time in the two clock periods (e.g., from 0 to 1 or from 1 to 0). Thus, the audio data AUD may be a data of two different potentials, such as 01 or 10. When the audio data AUD is 0, the potential can remain unchanged, and 11 or 00 may be obtained. All the audio data can be encoded into an audio data sequence with this encoding method. Therefore, the special code encoded with the second encoding rule can be inserted for other purposes. The second encoding rule is different from the first encoding rule. For example, the start data code, the end data code, and the audio frame clock code can be identified by some characteristic codes that are unlikely to show in the encoded audio data sequence, and these characteristic codes may be used to separate the encoded audio data sequence and the inserted audio frame clock signal.

Figure 5:
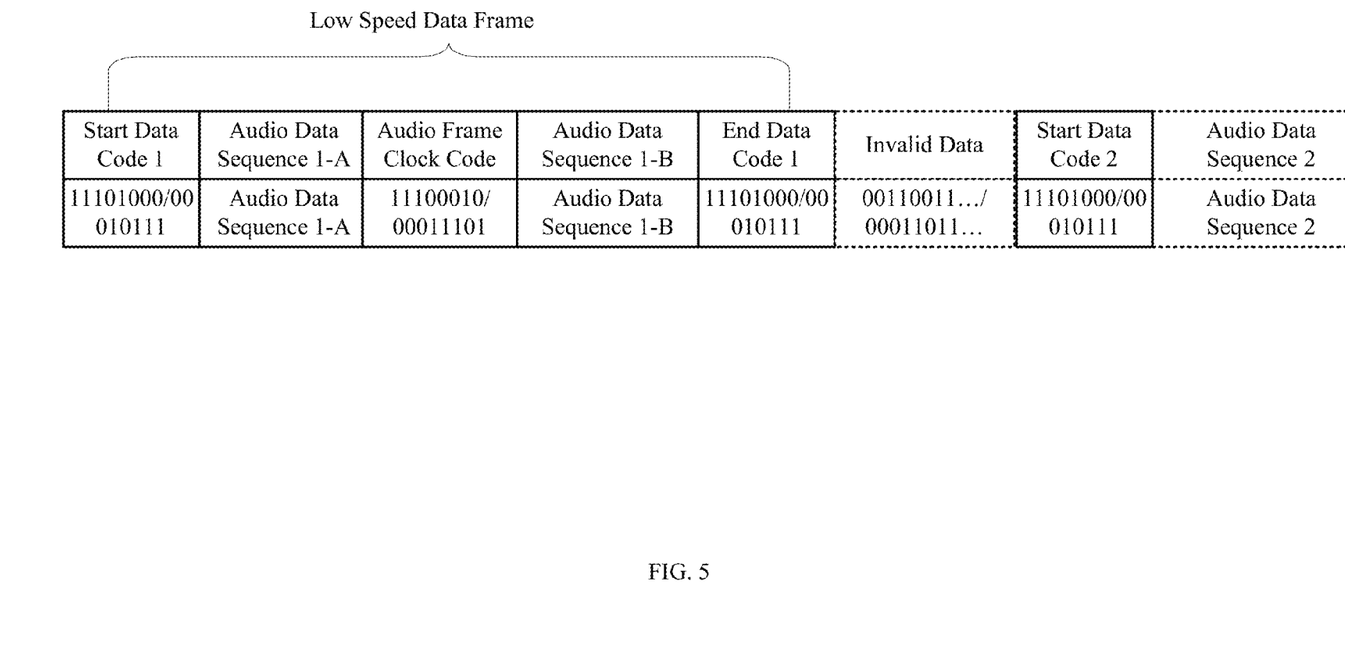
FIG. 5 is a diagram of an example format of a low speed frame, in accordance with embodiments of the present invention.

Referring now to FIG. 5, shown is a diagram of an example format of a low speed frame, in accordance with embodiments of the present invention. In this particular example, the specific coded values of characteristic codes, i.e., start data code, end data code, and the audio frame clock code are shown in Table 1 below.

TABLE 1

| Special Codes | Characteristic Codes | |
| --- | --- | --- |
| Start Data Code | 11101000 | 00010111 |
| End Data Code | 11100010 | 00011101 |

TABLE 1-continued

| Special Codes | Characteristic Codes | |
| --- | --- | --- |
| Audio Frame Clock Signal Code | 11100100 | 00011011 |

In this example, the number of bits of the audio-video transmission data formed by packing and serial-parallel processing the low-speed data frame representing the audio data and the video data frame representing the video data may be an appropriate value (e.g., 24 bits, 32 bits, etc.). For example, the low-speed data frame can occupy one bit of the audio-video transmission data.

In one approach, the audio-video transmission data formed by packing the low-speed data frame representing the audio data and the video data frame representing the video data may be transmitted to the receiving side over a single serial line in the way of transmitting the video data frame in a video data time period, and transmitting the low-speed data frame in an audio data time period. However, since the low-speed data frame may only occupies one bit of the audio-video transmission data, the audio data time period for transmitting the low speed data frame is relatively short, which can lead to a relatively low transmission efficiency of the audio data.

In the audio-video data transmitting method in particular embodiments, first, the active state and the inactive state of the current video signal may be judged or otherwise determined. When the video signal is in the active state, the video data frame can be transmitted during the video data time period, and the low speed data frame may be transmitted during the audio data time period. When the video signal is in the inactive state, the low-speed data frame can be transmitted to the receiving side by using the whole or a portion of the video data time period in the idle time interval of the video signal.

Figure 6:
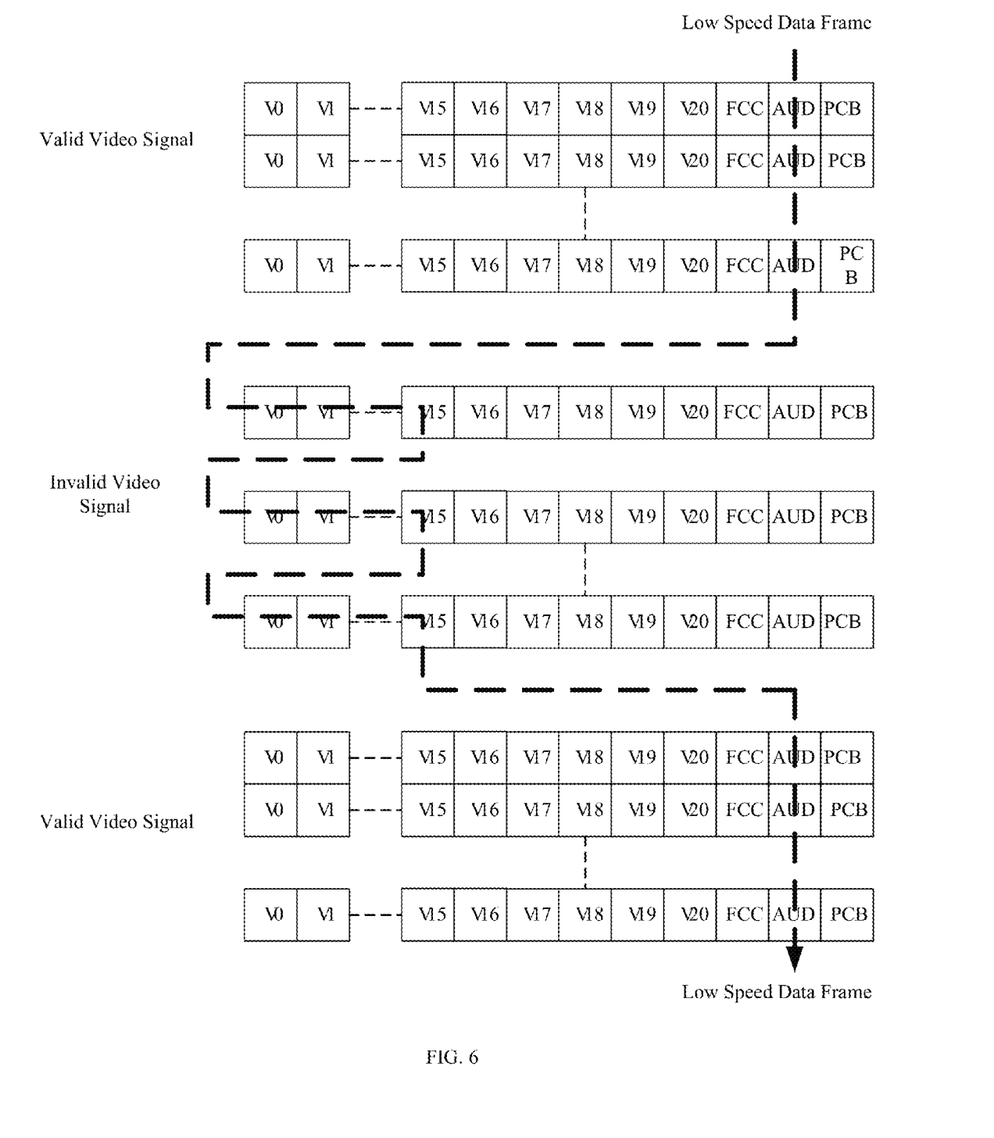
FIG. 6 is a diagram of example transmitting an audio-video data, in accordance with embodiments of the present invention.

Referring now to FIG. 6, shown is a diagram of example transmitting an audio-video data, in accordance with embodiments of the present invention. In this particular example, when the video signal is in the active state, the video data frame can be transmitted during the video data time period and the low speed data frame may be transmitted during the audio data time period. When the video signal is in the inactive state, the low speed data frame can be transmitted by using, e.g., 16 audio data time periods during the idle time interval of the video signal, which may significantly improve the transmission speed and efficiency.

Of course, other appropriate transmission times can be selected as desired without being limited to the examples herein. For example, the low speed data frame may be transmitted in the audio data time period during the active time interval of the video signal and the video data time period during the idle time interval of the video signal. Alternatively, the audio frame clock code of the low speed data frame can be transmitted in the audio data time period during the active time interval of the video signal, and the audio data sequence of the low speed data frame may be transmitted in the video data time period during the idle time interval of the video signal.

Figure 7:
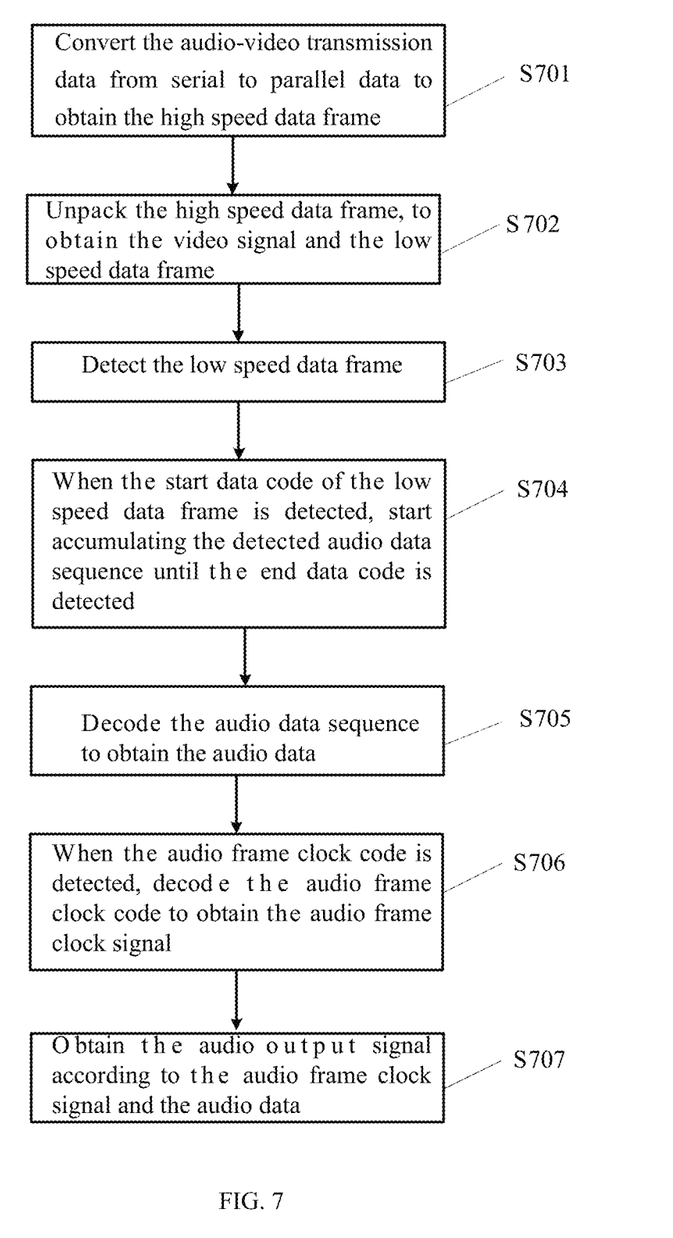
FIG. 7 is a flow diagram of an example method of receiving an audio-video data, in accordance with embodiments of the present invention.

Referring now to FIG. 7, shown is a flow diagram of an example method of receiving an audio-video data, in accordance with embodiments of the present invention. In this particular example, the audio-video transmission data (e.g., as shown above in FIG. 2) can be received to separate the corresponding high speed data frame and low speed data frame. In addition, corresponding audio signal and video signal may be obtained by unpacking and decoding the high speed data frame and the low speed data frame. The described operations can be carried out at the same time without a determined order, and the order shown in FIG. 7 is only one such example ordering.

In this example, the transmitting of an audio-video data may include, at S701, receiving and converting the audio-video transmission data from serial to parallel, in order to obtain a high speed data frame. At S702, the high speed data frame can be unpacked to obtain a corresponding video signal and a low speed data. At S703, the low speed data frame can be detected. At S704, when the start data code of the low speed data frame is detected, the detected audio data sequence can be accumulated until the end data code is detected. At S705, the audio data sequence can be decoded to obtain a corresponding audio data. At S706, when the audio frame clock code is detected, the audio frame clock code can be decoded to obtain the audio frame clock signal. At S707, the audio data can be obtained according to the audio frame clock signal and the audio data.

Since the audio frame clock signal adopts a special encoding that is different from that of the audio data, the clock signals used in writing and reading the audio data may be uniform. Thus, the audio frame clock signal can be accurately transmitted and restored, in order to ensure the accuracy of reading the audio data, and to substantially avoid errors in the transmission of the audio signal, and to simplify the overall system implementation.

In one embodiment, an audio-video transmission system can include: (i) a transmitting device configured to receive a video signal from a video source and an audio signal from an audio source, and appropriately encoding, packing, and serializing the video signal and the audio signal to obtain an audio-video transmission data carrying the information of the video signal and the audio signal; (ii) the transmitting device comprising an audio data encoding circuit, an audio frame clock signal detection circuit, and a low speed data frame packing circuit; (iii) the audio data encoding circuit being configured to convert an audio data of the audio signal to an audio data sequence with a first encoding rule; (iv) the audio frame clock signal detection circuit being configured to detect an audio frame clock signal of the audio signal, and to obtain information of the audio frame clock signal; (v) the low speed data frame packing circuit being configured to pack the audio data sequence, the start data code, the end data code and the audio frame clock code, to form a low speed data frame, where the start data code, the end data code and the audio frame clock code are generated with a second encoding rule, the first encoding rule being different than the second encoding rule, and where the low speed data frame is generated according to the audio frame clock signal and the audio data sequence; (vi) a single serial line configured to transmit the audio-video transmission data; and (vii) a receiving device configured to receive the audio-video transmission data, and to obtain the video signal and the audio signal by unpacking and decoding the audio-video transmission data.

Figure 8:
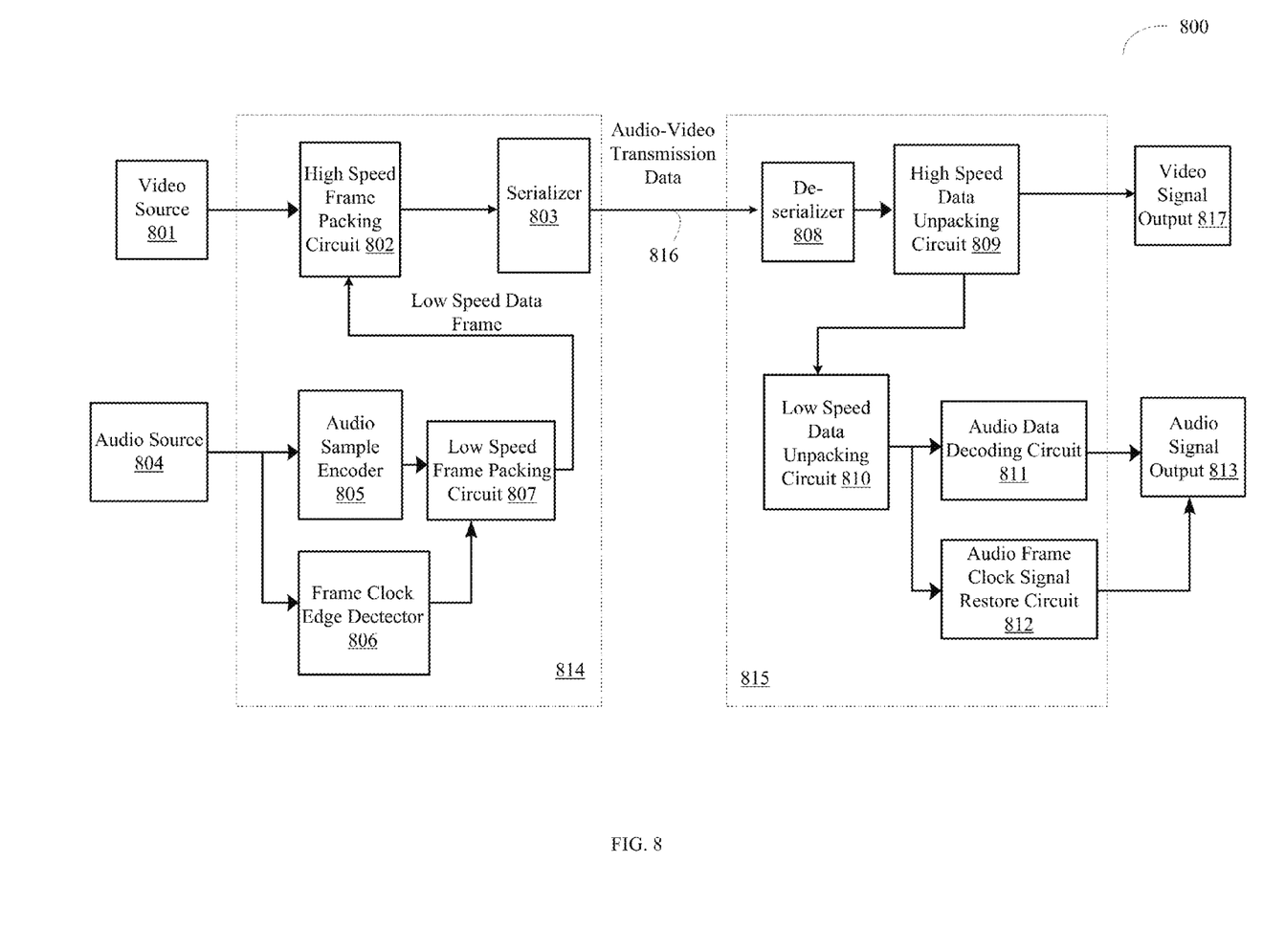
FIG. 8 is a schematic block diagram of an example audio-video data transmission, in accordance with embodiments of the present invention.

Referring now to FIG. 8, shown is a schematic block diagram of an example audio-video data transmission, in accordance with embodiments of the present invention. In this particular example, audio-video transmission system 800 can include transmitting device 814, a receiving device 816, and a single serial line 815 being coupled between the transmitting device 814 and the receiving device 816. Transmitting device 814 can receive a video signal from video source 701 and an audio signal from audio source 802, and may appropriately encode and pack the video signal and the audio signal in order to obtain an audio-video transmission data carrying the video signal and the audio signal information. Receiving device 816 can receive the audio-video transmission data, and unpack and decode the audio-video transmission data over single serial line 815, in order to obtain and transmit the video signal to video signal output 810 and the audio signal to audio signal output 813.

For example, transmitting device 814 can include audio data encoding circuit 805, audio frame clock signal detection circuit 806, and low speed data frame packing circuit 807, for converting and processing the received audio signal. Audio data encoding circuit 805 can encode the audio data of the received audio signal with a first encoding rule, and obtain an audio data sequence. Audio frame clock signal detection circuit 806 may detect the audio frame clock signal of the audio signal, and obtain the audio frame clock signal information. Low speed data frame packing circuit 807 can receive the audio data sequence and the audio frame clock signal information, and may generate a start data code, an end data code, and an audio frame clock code according to the audio frame clock signal information with a second encoding rule. Also, low speed data frame packing circuit 807 can generate a low speed data frame according to the start data code, the end data code, the audio frame clock code, and the audio data sequence. In addition, the start data code may be inserted at the beginning of each audio data sequence, and the end data code may be inserted at the ending of each audio data sequence. Further, the audio frame clock code may be inserted to the low speed data frame at the beginning of each audio frame clock signal.

Transmitting device 814 can also include high speed frame packing circuit 802 and serializing circuit 803. High speed frame packing circuit 802 can be used to packing the received video signal and the low speed data frame, in order to form a high speed data frame. In addition, serializing circuit 803 can be used to serialize the high speed data frame, in order to form a serial audio-video transmission data.

Single serial line 816 can be used to transmit the audio-video transmission data of a certain number of bits to receiving device 815. The video data representing the video signal may be transmitted in the video data time period, and the low speed data frame can be transmitted in the audio data time period. In order to improve the transmission efficiency of the audio data, the transmitting device 814 can also include a video signal state detection circuit, in order to detect the state of the current video signal, and to determine if the current video signal is in the active state or the inactive state. When the video signal is in the active state, the video data representing the video signal can be transmitted in the video data time period and the low speed data frame may be transmitted in the audio data time period. When the video signal is in the inactive state, the low speed data frame can be transmitted to the receiving side by using the whole or a portion of the video data time period during the idle time interval of the video signal.

For example, when the video signal is in the active state, the video data can be transmitted in the video data time period and the low speed data frame in the audio data time period. When the video signal is in the inactive state, the low speed data frame can be transmitted by using a part of the video data time period during the idle time period of the video signal, so as to significantly improve the transmission speed and efficiency.

Of course, other appropriate transmission times can be selected as desired without being limited to the example above. In one such case, the low speed data frame can be transmitted in the audio data time period during the active time interval of the video signal and the video data time period during the idle time interval of the video signal. Alternatively, the audio frame clock code of the low speed data frame may be transmitted in the audio data time period during the active time interval of the video signal, and the audio data sequence of the low speed data frame can be transmitted in the video data time period during the idle time interval of the video signal.

Receiving device 815 can include de-serializer 808, for converting the received audio-video transmission data from serial to parallel, in order to obtain the high speed data frame. High speed data frame unpacking circuit 809 included in receiving device 815 may be used to unpack and decode the high speed data frame, in order to obtain a corresponding video data and a low speed data. Then, the video data can be transmitted to video signal output 817, and the low speed data frame may be transmitted to the low speed data frame unpacking circuit 811. Low speed data frame unpacking circuit 810 can be included in receiving device 815 and can be used to unpack and decode the low speed data frame in order to obtain the audio data sequence and audio frame clock signal information. Audio data decoding circuit 811 can be used to decode the audio data sequence, and to obtain the audio data. Audio frame clock code restoring circuit 812 can be used to obtain the audio frame clock code by detecting the audio frame clock code. The audio signal can be accurately restored according to the audio data and the audio signal clock signal, and may be further transmitted to the audio signal output 813.

In this example encoding approach, particularly the special encoding method of the audio frame clock signal, the clock signal can be used in the writing and reading of the audio data can be made uniform. In this way, the audio frame clock signal can be accurately transmitted and restored, in order to ensure the accuracy of reading the audio data, and to avoid errors in the transmission of the audio signal.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A method for transmitting an audio-video data, the method comprising:
   a) receiving a video signal from a video source and an audio signal from an audio source;
   b) receiving an audio data of said audio signal, and detecting an audio frame clock signal of said audio signal;
   c) converting said audio data to an audio data sequence with a first encoding rule;
   d) generating a start data code and an end data code according to said audio data sequence and said audio frame clock signal with a second encoding rule;
   e) generating an audio frame clock code with said second encoding rule and according to said audio data sequence and said audio frame clock signal, wherein said first encoding rule is different than said second encoding rule;
   f) generating a low speed data frame according to said audio frame clock signal and said audio data sequence;
   g) inserting said start data code at the beginning of each audio data sequence, and inserting said end data code at the ending of each audio data sequence;

h) inserting said audio frame clock code to said low speed data frame at the beginning of each audio frame clock signal, wherein said audio frame clock code is between said start data code and said end data code in said low speed data frame;

i) packing said low speed data frame and said video signal to form a high speed data frame; and j) serializing said high speed data frame to form an audio-video transmission data.

2. The method of claim 1, wherein one bit of said audio-video transmission data is said low speed data frame.

3. The method of claim 1, wherein said audio frame clock code is inserted to said low speed data frame at the rising edge of each audio frame clock signal.

4. The method of claim 1, further comprising padding an invalid data between every two frames of said low speed data frame.

5. The method of claim 1, wherein said first encoding rule uses a clock frequency that is an integer multiple of the transmission bit rate of said audio-video transmission data.

6. The method of claim 5, wherein said start data code, said end data code, and said audio frame clock code are different than said encoded audio data sequence.

7. The method of claim 1, wherein said low speed data frame is transmitted by using the whole or a portion of a video data time period during an idle time interval of said video signal.

8. The method of claim 7, wherein said low speed data frame is transmitted by using a video data time period during an idle time interval of said video signal.

9. The method of claim 7, wherein said low speed data frame is transmitted by using an audio data time period during a valid time interval of said video signal, and by using a video data time period during said idle time interval of said video signal.

10. The method of claim 7, wherein said audio frame clock code of said low speed data frame is transmitted by using an audio data time period during a valid time interval of said video signal, and said audio data sequence of said low speed data frame is transmitted by using a video data time period during said idle time interval of said video signal.

11. A method for receiving the audio-video data of claim 1, the method comprising:

a) receiving said audio-video transmission data;

b) converting said audio-video transmission data from serial to parallel data to obtain said high speed data frame;

c) unpacking said high speed data frame to obtain said video signal and said low speed data frame;

d) detecting said low speed data frame;

e) when said start data code of said low speed data frame is detected, accumulating said detected audio data sequence until said end data code is detected;

f) decoding said audio data sequence to obtain said audio data;

g) when said audio frame clock code is detected, decoding said audio frame clock code to obtain said audio frame clock signal; and h) obtaining said audio signal according to said audio frame clock signal and said audio data.

12. An audio-video transmission system, comprising:

a) a transmitting device configured to receive a video signal from a video source and an audio signal from an audio source, and appropriately encoding, packing, and serializing said video signal and said audio signal to obtain an audio-video transmission data carrying the information of said video signal and said audio signal;

b) said transmitting device comprising an audio data encoding circuit, an audio frame clock signal detection circuit, and a low speed data frame packing circuit;

c) said audio data encoding circuit being configured to convert an audio data of said audio signal to an audio data sequence with a first encoding rule;

d) said audio frame clock signal detection circuit being configured to detect an audio frame clock signal of said audio signal, and to obtain information of said audio frame clock signal;

e) said low speed data frame packing circuit being configured to pack said audio data sequence, said start data code, said end data code, and said audio frame clock code, to form a low speed data frame, wherein said start data code, said end data code, and said audio frame clock code are generated with a second encoding rule, said first encoding rule being different than said second encoding rule, wherein said low speed data frame is generated according to said audio frame clock signal and said audio data sequence, and wherein said audio frame clock code is between said start data code and said end data code in said low speed data frame;

f) a single serial line configured to transmit said audio-video transmission data; and g) a receiving device configured to receive said audio-video transmission data, and to obtain said video signal and said audio signal by unpacking and decoding said audio-video transmission data.

13. The audio-video transmission system of claim 12, wherein:

a) said start data code is inserted at the beginning of each audio data sequence, and said end data code is inserted at the ending of each audio data sequence; and b) said audio frame clock code is inserted to said low speed data frame at the beginning of each audio frame clock signal.

14. The audio-video transmission system of claim 12, wherein said low speed data frame is transmitted to said receiving device by using the whole or a portion of a video data time period during an idle time interval of said video signal.

15. The audio-video transmission system of claim 12, wherein said receiving device comprises:

a) a de-serializer configured to receive and convert said audio-video transmission signal from serial to parallel to obtain a high speed data frame;

b) a high speed frame unpacking circuit configured to de-pack said high speed data frame to obtain said video signal and said low speed data frame;

c) a low speed data frame unpacking circuit configured to de-pack and decode said low speed data frame to obtain the information of said audio data sequence and said audio frame clock signal respectively;

d) an audio data decoding circuit configured to decode said audio data sequence to obtain said audio data;

e) an audio frame clock signal restore circuit configured to obtain said audio frame clock signal according to said audio frame clock signal code; and f) said audio signal is obtained according to said audio data and said audio frame clock signal.

16. The audio-video transmission system of claim 12, wherein an invalid data is padded between every two frames of said low speed data frame.

17. The audio-video transmission system of claim 16, wherein said invalid data is configured to form said low speed data frame at a predetermined timing.

18. The method of claim 4, wherein said invalid data is configured to form said low speed data frame at a predetermined timing.

\* \* \* \* \*